3,493,471
ACRYLIC ACID PURIFICATION
Robert N. Bashaw, Lake Jackson, Tex., assignor to The Dow Chemical Company, Midland, Mich., a corporation of Delaware
No Drawing. Filed Dec. 1, 1967, Ser. No. 687,153
Int. Cl. B01d 3/34, 15/04
U.S. Cl. 203—8                                              6 Claims

ABSTRACT OF THE DISCLOSURE

Inhibited acrylic acid is purified for polymerization by distillation through a packing of copper. The overhead vapors are quenched in cold deionized water. Preferably, quenching is accomplished by spraying the acid vapors with water at a temperature below about 20° C. The resulting aqueous solution of acrylic acid is contacted with an ion exchange or chelating resin to remove copper cations. Monomer prepared in this manner is polymerized to provide high molecular weight polymers.

---

The present invention concerns an improved method for the purification of acrylic acid. More particularly it concerns the preparation of acrylic acid used in the polymerization of high molecular weight, flocculant-grade polymers.

Acrylic acid is used in the synthesis of many polymers. So that the readily polymerized monomer may be stored, shipped and otherwise handled prior to use, it is inhibited with an appropriate additive, such as methylhydroquinone or phenothiazine. For many purposes, the monomer may be polymerized in the presence of such inhibitors. It has been discovered, however, that the presence of such inhibitors reduces the molecular weight of the polymeric product.

Although purification techniques are known for reducing the inhibitor content of acrylic acid, they either leave inhibitor residuals that are too large or result in premature polymerization and thus waste of monomer.

Accordingly, it is an object of the invention to provide a novel process for the purification of acrylic acid. Especially, it is an object to prepare acrylic acid suitable for the polymerization of high molecular weight polymers. A particular object is to provide an improved process for the preparation of flocculant grade polyacrylic acids.

The foregoing objects and other benefits, as will become apparent hereinafter, are accomplished in the present invention which comprises distilling inhibited acrylic acid through a packing of copper. Such distillation may be conducted at normal atmospheric pressures or under reduced pressures and consequently lower pot temperatures. Acrylic acid vapor evolving from the copper packing is quenched in deionized water at a temperature less than about 20° C., preferably less than about 10° C. The amount of water used relative to monomer is controlled to provide a desired monomer concentration. This solution is then contacted with an ion exchange or chelating resin for copper ions in aqueous solution under acid conditions.

Suitable for this purpose are the various sulfonic acid cation exchange resins, of which many are known and available. See for instance, U.S. Patents 2,366,007 and 2,471,818. Exemplary chelating resins useful for this purpose are those described in U.S. Patent 2,980,607. The monomer effluent from such resins will be substantially free of inhibitor and effective for the polymerization of high molecular weight polymers.

The practice of the instant invention is illustrated by the following preferred embodiments. Acrylic acid is distilled under reduced pressure sufficient to give a pot temperature within the range from about 50 to 60° C. The vapors are conducted into a column with a packing of copper wire supported on stainless steel. The packing is formed by rolling together an overlay of copper wire screen on a stainless steel wire screen. During the distillation operation, the acrylic acid slowly attacks the copper, a very small part of which is entrained in the overhead distillate, while the larger part is carried to the pot in liquid reflux. After continued distillation, the copper packing is replaced as needed. Still bottoms are periodically discharged to maintain the liquid content of the pot at a level for efficient operation of the still.

Distillate is collected in deionized water at a temperature less than 20° C., preferably at about 10° C. Depending upon the amount of cold water employed, the monomer concentration will usually be about 8 to 60 percent, preferably 30 to 50 percent, by weight of the solution. This aqueous solution of acrylic acid is then contacted with a resin for separating copper ions from aqueous acid. A cation exchange resin in the form of a sulfonated copolymer of styrene and divinylbenzene in the hydrogen form is particularly effective for this purpose.

For polymerization to high molecular weight, water-soluble polymer, the purified aqueous solution of acrylic acid is adjusted, as needed, by the addition of deionized water to a monomer concentration from about 8 to 30% by weight. By high molecular weight is meant polymers, which at a concentration of 0.025 weight percent in water, at pH 7, yield a solution viscosity of at least 3 centistokes.

The monomer solution is purged with an inert gas, preferably nitrogen, for a sufficient time to effectively reduce its oxygen content to allow polymerization initiation. This usually requires purging for about 30 minutes. Then a catalyst is added. An azo-type catalyst, for example ABN ($\alpha,\alpha'$-azobisisobutyronitrile), is preferred. The amount of ABN used to prepare high molecular weight polymers is from about 17 to 340 milligrams (mg.) per kilogram (kg.) of monomer with 34 to 170 mg. being preferred. The polymerization system is maintained at a temperature from about 20° to 60° C., preferably 20° to 30° C. This catalyst will not function efficiently below about 20° C. Above 60° C., the molecular weight, or average chain length of the polymer, will decrease.

Alternatively, a peroxide, such as tert-butyl-peroxypivalate, can be used to initiate the polymerization. This catalyst may be used at concentrations from 25 to 760 mg. per kg. of acid at a temperature of from 10° to 30° C., preferably 10° to 20° C., to prepare high molecular weight polymers.

Redox catalysts can also be used in this polymerization. Exemplary of this type catalyst is a mixture of potassium persulfate and sodium metabisulfite. A preferred redox catalyst system employs from 5.3 to 8.8 milliliters (ml.) of an aqueous solution containing 2.7 grams per liter of the persulfate and from 1.3 to 1.8 ml. of an aqueous solution containing 1.4 grams per liter of the metabisulfite for each kg. of the acid monomer to be polymerized. After catalization, the polymerization system is agitated, preferably by bubbling nitrogen therethrough, until the medium is too viscous for further agitation. The polymerization reaction is continued for 24 hours, with care being taken to maintain the temperature below about 60° C. Polymerization is retarded by exposing the polymer gel to oxygen. The polymer gel is neutralized by mixing with an alkali metal base and then dried and flaked or ground as necessary to give a desired particulate form of product.

In a specific embodiment, a high molecular weight polyacrylic acid was prepared by charging 29.5 kg. of acrylic acid, as a 15 percent by weight water solution, to a kettle reactor. The monomer solution was purged with nitrogen for 30 minutes to remove oxygen and then 0.06 gram of ferrous sulfate (as an activator) and 3.27 grams of α,α'-azobisisobutyronitrile catalyst were added in sequence with stirring. The mixture was thereafter agitated by sparging nitrogen through the monomer solution until the gel became too viscous for agitation in this manner. The polymerization was continued for 24 hours during which time the temperature rose from 30° to 60° C.

The polymerizate was neutralized by adding an aqueous solution containing 19.6 kg. of sodium hydroxide, 73.2 gm. of sodium thiosulfate and 73.2 gm. of thiodiglycol in 177.3 kg. of water. The sodium thiosulfate was added for the purpose of reacting with any residual monomer and the thiodiglycol was added as an antioxidant to improve the stability of the polymerizate during the following drying operation. The sodium polyacrylate was dried and flaked on a drum dryer at a temperature of about 168° C. The resulting polymer in a 0.025 percent by weight water solution gave a viscosity of 5.62 centistokes.

High molecular weight sodium polyacrylates prepared in the above manner are highly efficient flocculants for a wide variety of aqueous suspensions of particulate matter. They are especially useful in highly alkaline aqueous suspensions such as the clarification of red muds produced from the alkali digestion of bauxite to recover alumina values.

What is claimed is:
1. A process which comprises:
   (1) distilling inhibited acrylic acid through a copper packing,
   (2) quenching the acrylic acid vapor in water, at a temperature below about 20° C. to produce an aqueous solution containing from about 8 to 60 percent by weight of acrylic acid distillate and
   (3) contacting the resulting aqueous solution of acrylic acid distillate with a resin for separating copper ions from acidic water solution to reduce the copper content of the distillate solution to less than 1 part per million by weight, whereby a purified acrylic acid useful in the preparation of high molecular weight polymers is obtained.

2. A method as in claim 1 wherein the acrylic acid distillate is recovered in a cold spray of deionized water at a temperature below about 10° C.

3. A method as in claim 1 wherein the distillation is carried out under reduced pressure with a pot temperature below about 60° C.

4. A method as in claim 1 wherein the inhibited acrylic acid contains an organic polymerization inhibitor.

5. A method as in claim 1 wherein the amount of water used is sufficient to provide an aqueous solution of acrylic acid distillate having from about 30 to about 50 percent by weight acrylic acid.

6. A method as in claim 1 wherein the resin for separating copper ions from acidic water solution is an ion exchange resin or chelating resin.

References Cited

UNITED STATES PATENTS

| 2,471,959 | 5/1949 | Hunt | 260—89.5 |
| 2,983,717 | 5/1961 | Henley et al. | 260—80.3 |
| 3,405,106 | 10/1968 | Scanley | 260—80 |

FOREIGN PATENTS

| 1,150,930 | 1/1958 | France. |
| 1,359,885 | 4/1964 | France. |

JOSEPH L. SCHOFER, Primary Examiner

C. A. HENDERSON, JR., Assistant Examiner

U.S. Cl. X.R.

203—38, 42, 86, 92; 260—80, 80.3, 526